US012560257B2

(12) United States Patent
Stroeken et al.

(10) Patent No.: US 12,560,257 B2
(45) Date of Patent: Feb. 24, 2026

(54) VALVE

(71) Applicant: Weir Minerals Netherlands B.V.,
Venlo (NL)

(72) Inventors: Johannes Stroeken, Roermond (NL);
Frank Ummenthun, Venlo (NL)

(73) Assignee: Weir Minerals Netherlands, B.V (NL)

( * ) Notice: Subject to any disclaimer, the term of this
patent is extended or adjusted under 35
U.S.C. 154(b) by 0 days.

(21) Appl. No.: 18/845,855

(22) PCT Filed: Mar. 21, 2023

(86) PCT No.: PCT/IB2023/052729
§ 371 (c)(1),
(2) Date: Sep. 10, 2024

(87) PCT Pub. No.: WO2023/194832
PCT Pub. Date: Oct. 12, 2023

(65) Prior Publication Data
US 2025/0180141 A1     Jun. 5, 2025

(30) Foreign Application Priority Data
Apr. 4, 2022    (GB) ...................................... 2204870

(51) Int. Cl.
*F16K 39/02*        (2006.01)
*F16K 27/02*        (2006.01)
(52) U.S. Cl.
CPC .......... *F16K 39/02* (2013.01); *F16K 27/0272*
(2013.01)
(58) Field of Classification Search
CPC .. F16K 39/02; F16K 27/0272; F16K 31/0693;
F16K 1/385
See application file for complete search history.

(56) References Cited

U.S. PATENT DOCUMENTS

| | | | | |
|---|---|---|---|---|
| 2,152,831 A | * | 4/1939 | Williams | .............. F16K 39/022 |
| | | | | 251/210 |
| 2,202,735 A | * | 5/1940 | Johnson | .............. F16K 27/0272 |
| | | | | 137/375 |
| 3,004,555 A | * | 10/1961 | Haberland | .......... F16K 11/0708 |
| | | | | 137/625.68 |
| 3,010,695 A | * | 11/1961 | Banks | ....................... F16K 1/38 |
| | | | | 251/282 |

(Continued)

FOREIGN PATENT DOCUMENTS

WO        2021026258 A1    2/2021

*Primary Examiner* — Eric Keasel

(74) *Attorney, Agent, or Firm* — Morriss O'Bryant
Compagni Cannon,PLLC

(57)        ABSTRACT

A valve (18.1) includes a first and second port (50, 52)
connected by a flow path to allow medium containing solid
particles to pass therethrough. The valve also includes a
valve seat (61), a closure unit (62), and a cavity (85)
configured to receive at least part of the closure unit. The
closure unit further comprises (i) a barrier piston (74)
inhibiting the flow of solid particles from the second port
when the closure unit is in its closed position; (ii) a bleed
passage connecting the cavity with the second port to
provide a pressure balancing arrangement that reduces a
pressure therebetween, and (iii) a downwards sloping top
extending from a central portion of the barrier piston to the
outer surface of the barrier piston to permit fine particles in
the cavity to settle through the bleed passage towards the
second port.

10 Claims, 4 Drawing Sheets

(56) References Cited

U.S. PATENT DOCUMENTS

| | | | |
|---|---|---|---|
| 5,228,604 A | | 7/1993 | Zanini et al. |
| 8,312,902 B2 | | 11/2012 | Rivas |
| 9,052,031 B2 * | | 6/2015 | Leidig ................. F16K 31/0655 |
| 9,115,814 B2 | | 8/2015 | Zhimin et al. |
| 10,371,265 B2 * | | 8/2019 | Richardson ............... F16K 1/32 |
| 2017/0175906 A1 * | | 6/2017 | Martino .................. E21B 34/06 |
| 2019/0128428 A1 | | 5/2019 | Richardson et al. |

* cited by examiner

VALVE

FIELD OF INVENTION

This invention relates to a valve. It further relates to a valve closure unit; and a pressure exchange chamber pumping system. In addition, it relates to a pressure exchange pumping system kit. It also relates to a method on modifying a pressure exchange chamber pumping system.

BACKGROUND OF THE INVENTION

Cone valves are often used to regulate the flow of medium, particularly a medium which consists of a mixture of liquid and solid particles, such as a slurry.

One application where this occurs is in pressure exchange chamber ("PEC") pumping systems. A PEC pumping system typically includes a pipe defining a PEC and having a medium or pumped fluid valve arrangement at one end and a driving fluid valve arrangement at the other end. The medium valve arrangement includes a medium inlet valve whereby medium to be pumped can be admitted into the pressure exchange chamber and a medium outlet valve whereby pumped medium can be discharged from the PEC along a discharge pipe, riser, or the like. Similarly, the driving fluid valve arrangement includes a driving fluid inlet valve through which a high-pressure driving fluid can be admitted into the PEC and a driving fluid outlet valve whereby driving fluid can be discharged from the PEC.

In use, medium to be pumped may be fed to the medium inlet valve at a relatively low pressure by means of a medium delivery pump, such as a centrifugal pump. With the medium inlet valve open and the driving fluid outlet valve open medium enters the pressure exchange chamber and displaces driving fluid out of the PEC through the driving fluid outlet valve. Although the medium to be pumped is fed into the PEC at a relatively low pressure, if the PEC is located on a sea bed, the ambient pressure may be high, but it will be lower than the pressure of the high pressure driving fluid.

When the PEC has been charged with medium, i.e., a desired quantity of medium has entered the PEC, the medium inlet valve and driving fluid outlet valve are closed. The medium outlet valve and the driving fluid inlet valve are opened such that driving fluid enters the PEC at high pressure and displaces the medium out of the PEC through the medium outlet valve. Naturally, the exact sequence and timing associated with the opening and closing of the valves may vary to optimise operation of the pumping system.

Once the medium has been discharged from the PEC the medium outlet valve and driving fluid inlet valve close and the medium inlet valve and the driving fluid outlet valve open to charge the PEC with medium in the manner described above.

As mentioned above, to be able to operate with a medium containing solid particles, the medium inlet valves are typically cone valves.

The cone valves typically comprise a valve housing defining an elongate cavity, an inlet opening which leads upwardly into the bottom of the cavity and an outlet opening which is in flow communication with a side of the cavity at a position spaced from the inlet opening. A valve seat is provided between the inlet opening and the outlet opening. The valve includes a closure unit and an actuator whereby the closure unit is displaceable between a closed position in which it seats against the valve seat to inhibit the flow of medium through the valve and an open position in which it is clear of the valve seat and permits medium flow through the valve.

A problem with cone valves is that solid particles from the medium tend to settle in the cavity in the housing above the closure unit which can interfere with the proper functioning of the valve.

It is an object of an embodiment of this invention to provide means which may ameliorate this problem or provide a useful alternative.

SUMMARY OF THE INVENTION

This summary is provided to introduce a selection of concepts that are further described in the detailed description below. This summary is not intended to identify indispensable features of the claimed subject matter, nor is it intended for use as an aid in limiting the scope of the claimed subject matter.

In this application ordinal numbers (first, second, third, etc.) are assigned arbitrarily herein, and are used to differentiate between parts, and do not indicate a particular order, sequence, or importance.

Features or steps disclosed as options with respect to one aspect are intended to apply as options to other aspects, except where such combination is not possible.

According to a first aspect of the invention there is provided a valve comprising: a first port; a second port which is spaced from the first port; a flow path connecting the first and the second ports in flow communication to allow medium containing solid particles to pass therethrough; a valve seat positioned in the flow path; a closure unit which is displaceable between a closed position in which it seats against the valve seat to inhibit the flow of medium through the flow path and an open position in which it permits the flow of medium through the flow path; a cavity configured to receive at least part of the closure unit in its open position; wherein the closure unit further comprises a barrier piston defining (i) an outer surface configured to inhibit the flow of solid particles from the second port when the closure unit is in its closed position and thereby inhibit the passage of such solid particles into the cavity, (ii) one or more bleed passages connecting the cavity with the second port in flow communication to provide a pressure balancing arrangement that reduces a pressure differential therebetween, and (iii) a downwards sloping top extending from a central portion of the barrier piston to the outer surface of the barrier piston to permit fine particles in the cavity to settle through the one or more bleed passages towards the second port.

The reduced pressure differential may be the formation of a zone of reduced pressure above the piston that would inhibit closure of the valve. Alternatively, the reduced pressure differential may be the formation of a zone of higher pressure above the piston that would inhibit opening of the valve. Reducing a pressure differential has the advantage of ensuring that the piston can be moved at a desired speed for a given actuator force.

The barrier piston may have any convenient shape; in preferred embodiments, the barrier piston has a cylindrical shape and a circular cross-section, but in other embodiments an oval, rectangular, or polygon cross-section may be used.

Optionally, the valve comprises an actuated valve.

The valve may define a cylindrical chamber having a first end, a second end and a side extending therebetween, the first port opening into the chamber through the first end and the second port leading from the chamber through the side at a position spaced from the first end. The first end may be an operatively bottom end of the chamber. The valve seat may be frusto-conical in shape, tapering inwardly downwardly and the closure unit may be axially displaceable in the chamber between its open and closed positions.

The barrier piston may be mounted for reciprocation in the chamber above the first port. The barrier piston is preferably dimensioned to inhibit the passage of large solid particles into the chamber above the piston, in particular particles which are sufficiently large to potentially interfere with the displacement of the closure unit. To this end, a radial clearance between the piston and an interior surface of the housing defining the side of the chamber may be less than 2 mm. In a preferred embodiment of the invention, the clearance may be approximately 0.5 mm.

The piston may extend axially beyond the second port (in some embodiments the outlet) thereby effectively closing or blocking the second port when the closure unit is in its closed position to inhibit the backflow of medium through the second port into the chamber above the piston. Inhibiting the flow of solid particles from the second port when the closure unit is in its closed position may comprise inhibiting backflow of solid particles where the second port is the outlet.

Optionally, the one or more bleed passages may be defined in the outer surface of the barrier piston, for example, as axially extending grooves in a radially outer surface of the piston. Hence, a bleed passage will be defined by each of the grooves and the portion of the chamber side which is adjacent the groove.

The valve may include a housing and a sleeve positioned in the housing which defines at least part of the chamber.

The housing may define a cylinder having a central axis. The sleeve may be concentric with the housing cylinder and may define a cylinder in which the barrier piston is mounted. The sleeve may define a bore transverse to (in some embodiments perpendicular to) the central axis of the sleeve. The sleeve and housing may provide support to the piston to reduce or prevent lateral movement that may arise when ore particles are trapped between part of the closure unit and the valve seat. In particular, the sleeve may absorb eccentric forces on the piston caused by solids trapped between an engagement surface of the piston and a valve seat (on which the engagement surface abuts) when the piston is being closed. The sleeve may also protect the chamber from high velocity ore particles that would otherwise impact the chamber as the closure unit moves to the closed position and the gap between the closure unit and the valve seat reduces (increasing the particle velocity therethough).

The sleeve may define an opening having a smaller width (or diameter) than the width (or diameter) of the second port. The opening may be vertically offset from the opening such that a portion of the sleeve may act as a protruding wall extending upwards from a lower portion (floor) of the second port. This protruding wall may prevent flow of solid particles at the bottom of the second port (where large particles may settle due to gravity) towards the first port.

Using the sleeve as a liner for the chamber allows the sleeve to be treated with hard-facing to resist wear as it is not a dynamic pressure loaded part.

During use, the medium pressure will deform the housing, which causes the sleeve gap (i.e. the gap between the sleeve and the piston) to reduce and expand as the pressure increases and decreases respectively. The bleed passages connecting the cavity with the second port reduces damage to the sleeve and the piston by allowing the pressure to be relieved, for example, through the axially extending grooves in the piston.

The valve seat, valve, and the sleeve typically wear out by particle erosion over time. A stroke length of the piston and a height of the piston are selected to provide sufficient overlap to cover (or close) the second port.

Optionally, the barrier piston comprises a downward sloping upper surface extending from a central portion to a radially outer surface of the barrier piston. The central portion may comprise a level (e.g. horizontal, when the valve is mounted with its longitudinal axis in a vertical orientation) surface or a surface having the same slope, or a different slope, to the downward sloping upper surface. The downward sloping upper surface may comprise a conical downward sloping upper surface. The downward sloping upper surface directs any trapped particles in the cavity towards the axially extending grooves in the barrier piston so that small particles flow through the grooves and are guided back to the flow path. The size of particles that can be guided back to the flow path depends on the size of the grooves. In one embodiment, the grooves are 2 mm deep (i.e. extend 2 mm radially inwards towards the longitudinal axis) and 15 mm long; In other embodiments, the grooves may be between 1 mm and 3 mm deep and extend for the height of the barrier piston.

The downward sloping upper surface of the barrier piston may extend at an angle of at least 10, 12, 15, 18, 20, 25, 30, 35, 40, or 45 degrees to the horizontal.

The downward sloping upper surface of the barrier piston may extend at an angle of less than 85, 80, 75, 70, 65, 60, 55, 50, 45, 40, or 35 degrees to the horizontal.

Preferred embodiments may have the downward sloping upper surface of the barrier piston extending at an angle between 20 and 40 degrees to the horizontal.

The valve may be in the size range of DN80 to DN500.

According to a second aspect of the invention there is provided a pressure exchange chamber pumping system which includes: at least one pressure exchange chamber; and a medium or pumped fluid valve arrangement in flow communication with the pressure exchange chamber and a driving fluid valve arrangement in flow communication with the pressure exchange chamber at a position longitudinally spaced from the medium valve arrangement, the medium valve arrangement and/or the driving fluid valve arrangement including at least one valve of the type described above.

The medium valve arrangement may include a medium inlet valve whereby medium to be pumped can be admitted into the pressure exchange chamber and a medium outlet valve whereby pumped medium can be discharged from the pressure exchange chamber along a discharge pipe, riser, or the like, at least the medium inlet valve being a valve of the type described above.

In a preferred embodiment of the invention, the pressure exchange chamber pumping system includes a plurality of pressure exchange chambers arranged in parallel, and a feed arrangement including a feeder pump having a suction side and a discharge side connected in flow communication with the medium inlet valves.

The components of the pressure exchange chamber pumping system may be transported in a disassembled or knocked-down kit form for assembly at site.

Hence, according to a third aspect of the invention, there is provided a pressure exchange chamber pumping system kit which includes: pressure exchange chamber defining means defining a plurality of elongate pressure exchange chambers; a plurality of medium valve arrangements each of which is connected or connectable to one of the pressure exchange chambers, each medium valve arrangement including a medium inlet valve whereby medium to be pumped can be admitted into the associated pressure exchange chamber and a medium outlet valve whereby pumped medium can be discharged from the associated pressure exchange chamber; and a plurality of driving fluid valve arrangements which are connected or connectable to the pressure exchange chambers at a position longitudinally spaced from the medium valve arrangements, each driving fluid valve arrangement including a driving fluid inlet valve through which a driving fluid can be admitted into the associated pressure exchange chamber and a driving fluid outlet valve whereby driving fluid can be discharged from the associated pressure exchange chamber, at least one of the valves being a valve of the type described above.

According to a fourth aspect of the invention there is provided a valve closure unit for use with a valve of the type described above which defines an elongate cavity having a pair of opposed ends and a side extending therebetween, a first opening in flow communication with one end of the cavity, a second opening which is spaced from the first opening and is in flow communication with the cavity, a flow path connecting the first and second openings in flow communication, a valve seat provided in the flow path, the closure unit including (i) a head configured to seat sealingly against the valve seat, and (ii) a barrier piston coupled to the head and defining a bleed passage between the barrier piston and the side, where the barrier piston is receivable in the cavity for reciprocation between a closed position in which the head seats sealingly against the valve seat and an open position in which the head is clear of the valve seat to permit flow through the flow passage.

The valve closure unit may include an annular elastomeric seal. The seal may be held captive between the barrier piston and the head.

The barrier piston may have a circular cylindrical radially outer surface.

The barrier piston may define a bleed passage between an outer surface thereof and the elongate cavity. The bleed passage may comprise an annular gap. Alternatively, or additionally, the bleed passage may be defined by one or more channels defined in part by one or more longitudinally extending grooves. Each longitudinally extending groove may extend for the entire length of the outer surface of the barrier piston. In a preferred embodiment of the invention, a plurality of circumferentially spaced grooves is provided in the radially outer surface of the barrier piston.

The elongate cavity may be lined by a sleeve.

According to a fifth aspect of the invention there is provided a method of modifying a pressure exchange chamber pumping system comprising a plurality of pressure exchange chambers, each chamber including (i) a fluid container, (ii) a medium inlet valve whereby medium to be pumped can be admitted into the associated fluid container and (iii) a medium outlet valve whereby pumped medium can be discharged from the associated fluid container, (iv) a driving fluid inlet valve through which a driving fluid can be admitted into the associated fluid container, and (v) a driving fluid outlet valve whereby driving fluid can be discharged from the associated fluid container, which method includes removing at least one valve and replacing it with a valve as described above.

The method may, in particular, include removing each medium inlet valve and replacing it with a valve as described above.

According to a sixth aspect of the invention there is provided a valve comprising: a first port; a second port which is spaced from the first port; a flow path connecting the first and second ports in flow communication; a valve seat positioned in the flow path; a closure unit which is displaceable between a closed position in which it seats against the valve seat to inhibit the flow of medium through the flow path and an open position in which it permits the flow of medium through the flow path; and a barrier piston configured to inhibit the passage of solid particles which could interfere with the displacement of the closure unit into a closure unit receiving cavity within which at least part of the closure unit is received when the closure unit is in its open position and/or to inhibit the flow of medium from the second port when the closure unit is in its closed position.

BRIEF DESCRIPTION OF THE DRAWINGS

These and other aspects of the invention will now be described, by way of example, with reference to the accompanying diagrammatic drawings, in which.

DETAILED DESCRIPTION OF EMBODIMENTS

Figure 1:
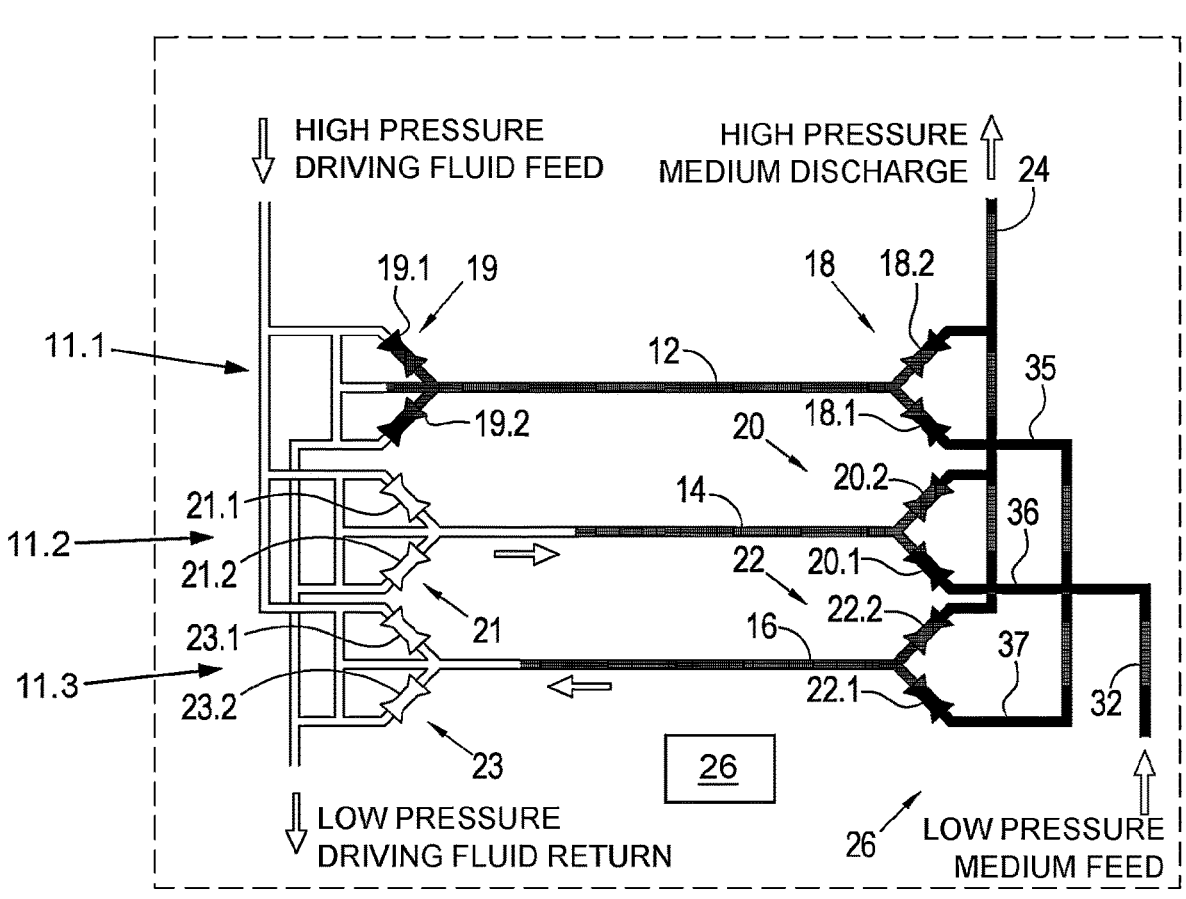
FIG. 1 shows a schematic view of a pressure exchange chamber pumping system in accordance with an embodiment of the invention.

In FIG. 1 of the drawings, reference numeral 10 refers generally to part of a pressure exchange chamber (PEC) pumping system in accordance with an embodiment of the invention.

The PEC pumping system 10 includes three PECs 11.1, 11.2, 11.3 defined by lengths of pipe 12, 14, 16, each having a medium or pumped fluid valve arrangement 18, 20, 22 connected respectively thereto at one end thereof, and a driving fluid valve arrangement 19, 21, 23 connected respectively thereto at the other end thereof, i.e. longitudinally spaced from the medium valve arrangements 18, 20, 22, in this embodiment. However, in other embodiments, different configurations of PEC may be used (such as a loop) so that the medium valve arrangements 18, 20, 22 may be located near the driving fluid valve arrangements 19, 21, 23.

Each medium valve arrangement 18, 20, 22 includes a medium inlet valve 18.1, 20.1, 22.1, in accordance with an embodiment the invention and as described in more detail herebelow, whereby medium to be pumped can be admitted into the associated pipe 12, 14, 16 and a medium outlet valve 18.2, 20.2, 22.2 whereby pumped medium can be discharged from the pipe 12, 14, 16 along a discharge riser 24. Similarly, each driving fluid valve arrangement 19, 21, 23 includes an inlet valve 19.1, 21.1, 23.1 through which a driving fluid can be admitted into the associated pipe and an outlet valve 19.2, 21.2, 23.2 whereby driving fluid can be discharged from the associated pipe.

The PEC pumping system 10 further includes a feed arrangement, part of which is generally indicated by reference numeral 26, configured to feed medium to be pumped to the medium inlet valves 18.1, 20.1, 22.1 as described in more detail herebelow. The feed arrangement 26 includes a feed or delivery pump (not shown in detail). The feed arrangement 26 further includes a pipe 32 which is connected to a source of ore particles and three feed lines 35, 36, 37 each of which has an upstream end connected to the pipe 32 and a downstream end. The downstream ends of the feed lines 35, 36, 37 are connected, respectively, to the medium inlet valves 18.1, 20.1, 22.1. Hence, in use medium to be pumped is transported through the pipe 32 and the feed lines 35, 36, 37 to the medium inlet valves 18.1, 20.1, 22.1.

In use, with the medium inlet valve 18.1, 20.1, 22.1 open and the corresponding driving fluid outlet valve 19.2, 21.2, 23.2 open, medium enters the associated pipe 12, 14, 16 and displaces the driving fluid out of the associated driving fluid outlet valve 19.2, 21.2, 23.2. When a desired quantity of medium has entered the pipe 12, 14, 16, the medium inlet valve 18.1 and driving fluid outlet valve 19.2 are closed. The medium outlet valve 18.2, 20.2, 22.2 and the driving fluid inlet valve 19.1, 21.1, 23.1 are opened such that driving fluid enters the pipe at high pressure and displaces the medium through the respective medium outlet valve 18.2, 20.2, 22.2 and thereby out of the pipe 12, 14, 16 and into the discharge riser 24.

Once the medium has been discharged from the pipe 12, 14, 16, the associated medium outlet valve and driving fluid inlet valve are closed and the medium inlet valve and driving fluid outlet valve are opened, once again, to charge the pipe 12, 14, 16 with medium in the manner described above.

To permit more or less continuous pumping, the operation of the valves of the different PECs 11.1, 11.2, 11.3 is staggered such that the filling of the pipes 12, 14, 16 with medium and the discharge of medium occurs in a more or less continuous basis.

The medium inlet valve 18.1, 20.1, 22.1 are substantially identical. In the interests of brevity of description, only the medium inlet valve 18.1 is described in detail herebelow with reference to FIGS. 2 to 5 of the drawings.

The valve 18.1 includes a hollow housing 40 which partially defines a cylindrical chamber 42 having a circular cross section, and a cap 43 above the housing 40. The chamber 42 is defined by a bottom 44, a top 46 and a side 48 extending between the bottom 44 and the top 46. The top 46 is defined by a lower surface of the cap 43. A circular cylindrical sleeve or liner 55 is positioned in the housing and a radially inner surface of the liner 55 abuts the side 48 and extends into the cap 43. A first port 50 extends through the housing 40 into the bottom 44 of the chamber 42. A second port 52 extends through the housing 40 and liner 55 into the chamber 42 through the side 48 at a position spaced from the port 50. In this embodiment, the port 50 forms an inlet and the port 52 forms an outlet. However, in other embodiments the port 52 could be an inlet and the port 50 an outlet.

An annular seat ring 54 is mounted in the chamber 42 adjacent to the inlet 50. In the embodiment shown, the sleeve or liner 55 extends between the seat ring 54 and into the cap 43. An opening 57 is provided in the liner 55 and is aligned with the port 52. The ports 50, 52 are connected in flow communication by means of a flow path, part of which is formed by a passage 56 (see FIG. 3) extending through the seat ring 54. The passage 56 includes a cylindrical portion 58 (having a circular cross section) (FIG. 3) which is in flow communication with the port 50 and a frustoconical portion 60 (FIG. 3) which opens into the chamber 42. A surface 61 of the frustoconical portion 60 forms a valve seat as described in more detail herebelow.

The valve 18.1 further includes a closure unit, generally indicated by reference numeral 62 and an actuator, part of which is generally indicated by reference numeral 64.

The valve 18.1 extends along a longitudinal axis 66 which is co-axial with the circular cylindrical chamber 42, the inlet port 50, and the liner 55; and perpendicular to the outlet port 52. In this embodiment, the valve 18.1 is oriented generally vertically (i.e. longitudinal axis 66 is vertical), with the first port 50 lower than the second port 52.

The closure unit 62 includes: (i) an annular seal 68 which is typically formed from an elastomeric material and has a frustoconical seal surface 70 which is complementary to the valve seat 61, (ii) a head 72, and (iii) a barrier piston 74.

The seal 68 is sandwiched between the head 72 and the barrier piston 74 which are secured together by a retaining stud bolt 76 which extends axially through the head 72 and piston 74 and retaining nuts 78 which are mounted on end portions of the stud bolt 76 to urge the head 72 and piston 74 inwardly towards one another and retain the seal 68 in position. The stud bolt 76 and retaining nut 78 may also be considered as part of the closure unit 62, although different techniques for mutually coupling the seal 68, head 72, and barrier piston 74 may be used in other closure units.

The head 72 defines a frustoconical surface 80 which is complementary to the valve seat 61.

The barrier piston 74 has a circular cylindrical outer surface 75, the dimensions of which are selected such that it is snuggly receivable for reciprocation within the sleeve 55 with little clearance between the outer surface 75 of the piston 74 and a radially inner surface 59 of the sleeve 55. In some embodiments, the little clearance may comprise an annular gap that functions as a bleed passage.

Figure 2:
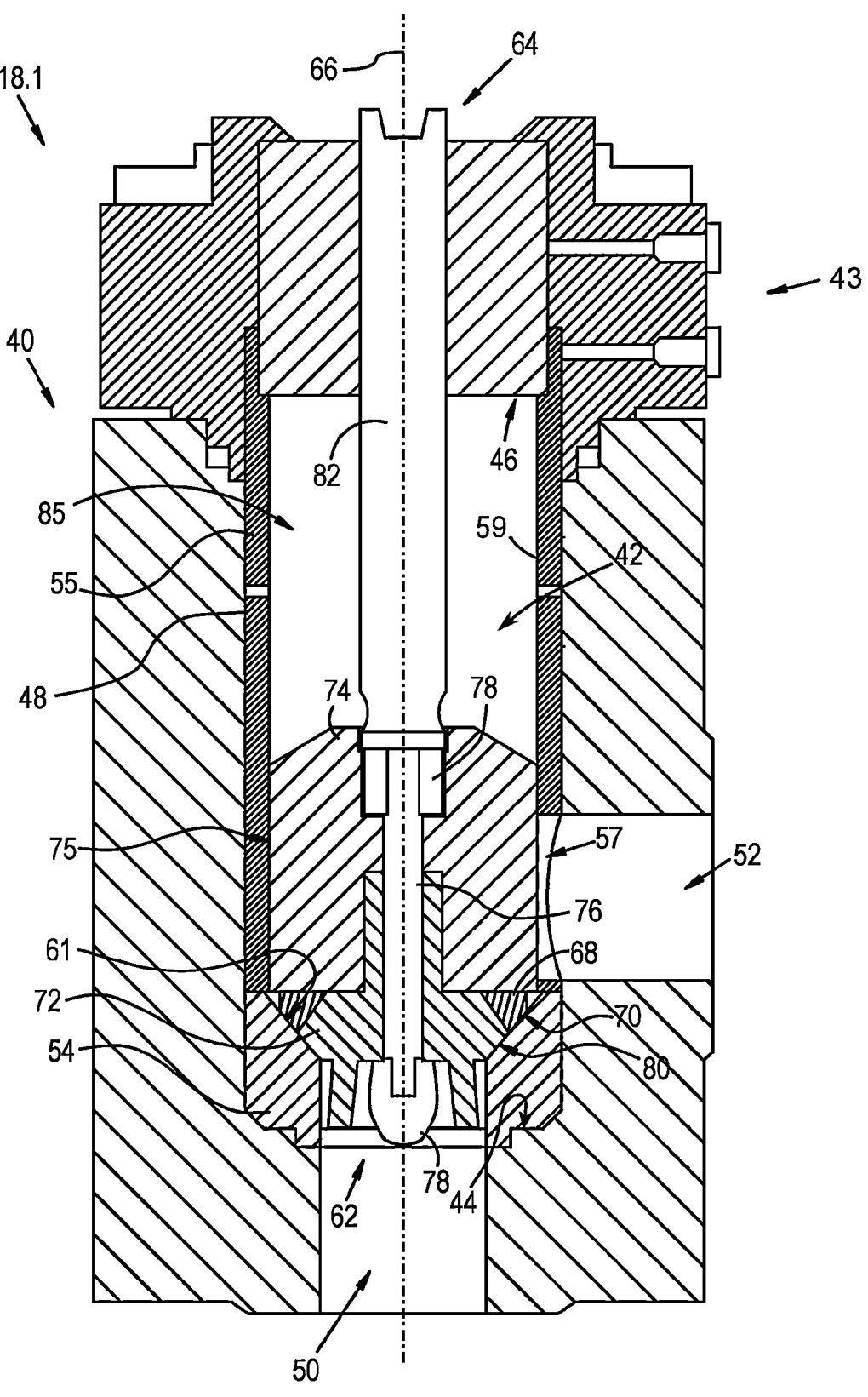
FIG. 2 shows a longitudinal sectional view of a valve in accordance with another embodiment of the invention which forms part of the pressure exchange chamber pumping system of FIG. 1, a closure unit of the valve being shown in a closed position.
Figure 3:
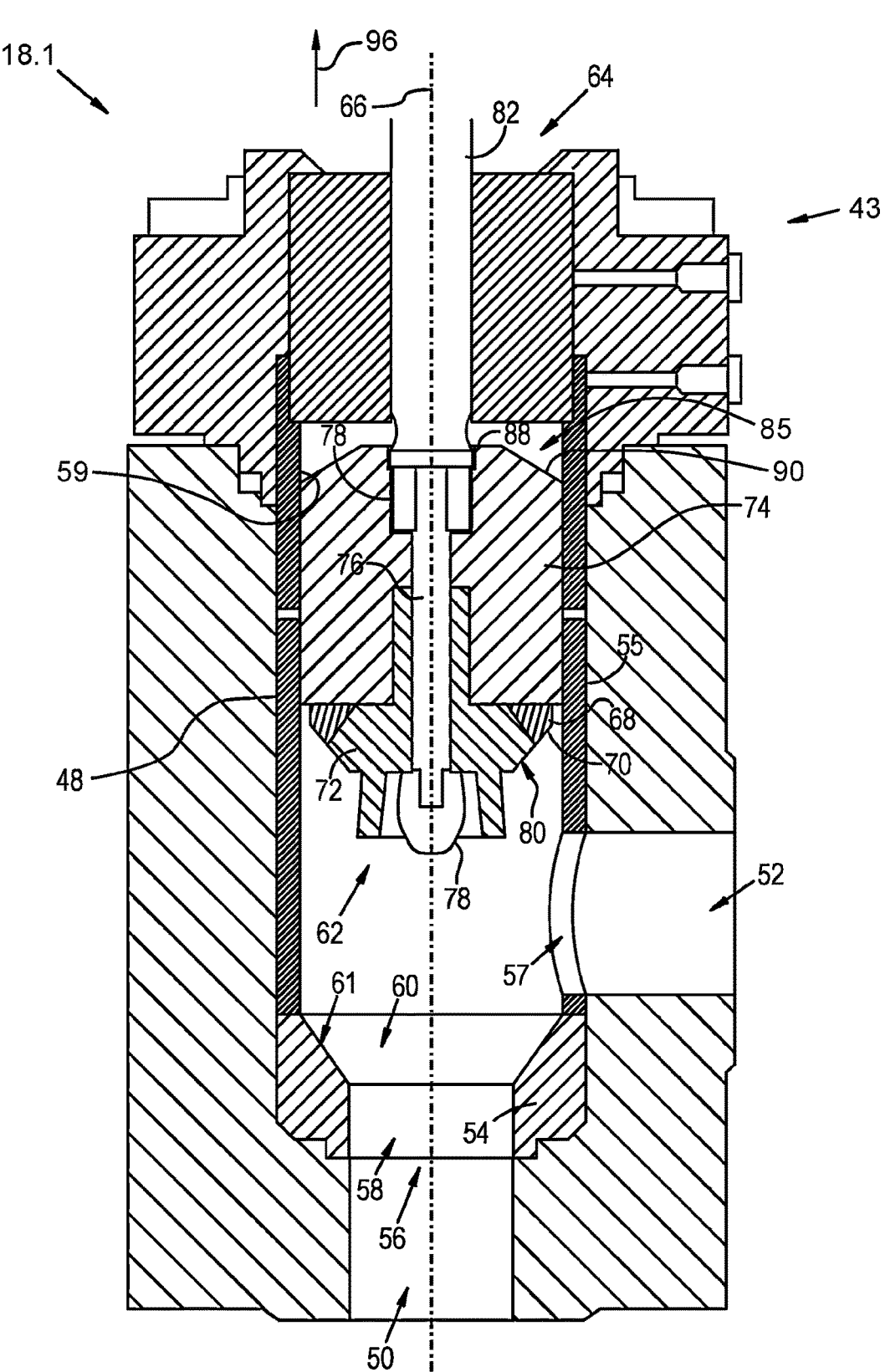
FIG. 3 shows a sectional view similar to FIG. 2 with the closure unit of the valve in an open position.

The actuator is typically in the form of a linear actuator such as a hydraulic piston and cylinder arrangement which includes an elongate coaxially extending actuator rod 82 which extends through the cap 43 at the top of the housing 40 and is connected to the stud bolt 76 to facilitate displacement of the closure unit 62 and piston 74 between a closed position (shown in FIG. 2 of the drawings) and an open position (shown in FIG. 3 of the drawings).

As can best be seen in FIG. 4 of the drawings, a plurality of circumferentially spaced axially extending grooves 84 is provided in the radially outer surface 75 of the piston 74 which, together with the radially inner surface 59 of the sleeve 55 (or the side 48 for embodiments where a sleeve is not used) form bleed passages to prevent the creation of a vacuum as described in more detail below. Furthermore, the grooves 84 allow fine particles to settle out of the cavity 85 and towards the second port 52, thereby preventing blockages in the cavity 85. The grooves 84 also assist with reducing the viscous forces during movement of the piston 74.

The barrier piston 74 defines an upper portion 86 having a flat central portion 88 defining a bore 90 for receiving the actuator rod 82, and an outer portion 92 sloping downwards (in this embodiment towards the valve seat 61) as it extends towards the radially outer surface 75. The outer portion 92 may be referred to as a downwards sloping portion when the valve is mounted in an upright orientation, as shown in FIGS. 2 and 3. In this embodiment, the downwards sloping portion 92 extends at an angle of between 25 and 35 degrees to the horizontal (i.e. perpendicular to longitudinal axis 66).

As mentioned above, the medium typically comprises a liquid (such as water) in which solid particles are entrained. Some of the solid particles may be small (fine), others medium size, and others relatively large.

With reference to FIG. 2 of the drawings, in the closed position of the valve 18.1, the seal surface 70 and the frusto-conical surface 80 of the head 72 abut sealingly against the valve seat 61 formed by the frusto-conical portion 60 of the seat ring 54 to inhibit the flow of medium through the valve. In this regard, the seal 68 protrudes radially beyond the surface 80 such that when the closure unit 62 is being displaced towards its closed position, the seal surface 70 of the seal 68 abuts against the valve seat 61 before the frusto-conical surface 80. By virtue of the seal 68 being formed of an elastomeric material, it is able to form a reliable seal even if small solid particles are trapped between the surface 80 and the valve seat 61.

Of importance to note is that in the closed position, the piston 74 protrudes axially into the chamber 42 from a position, below a lower edge of the opening 57 upwardly beyond the port 52 and opening 57 and accordingly forms a barrier which effectively closes off the opening 57 and resists the flow of material or medium through the port 52 into the chamber 42 even when the valve is in its closed position. The portion of the chamber 42 above the piston 74 forms a closure unit receiving cavity, generally indicated by reference numeral 85, into which at least part of the closure unit 62 (e.g. the piston 74) is displaced when the valve is in an open position as described below.

With reference to FIG. 3 of the drawings, to open the valve 18.1, the rod 82 is displaced in the direction of arrow 96 such that the piston 74 and closure unit 62 are drawn upwardly into the portion of the chamber 42 defining the closure unit receiving cavity 85 thereby connecting the inlet 50 and outlet 52 in flow communication and permitting the free flow of medium through the valve 18.1.

To close the valve 18.1, the piston 74 and closure unit 62 are displaced in the direction opposite to the direction of arrow 96 into the closed position shown in FIG. 2 of the drawings.

By virtue of the snug fit of the piston 74 within the chamber 42 and in particular the restricted clearance between the radially outer surface 75 of the piston 74 and the inner surface 59 of the liner 55, large solid particles are unable to pass between the piston 74 and the liner 55 into the portion of the cavity above the piston 74 where they could potentially accumulate and inhibit the displacement of the piston 74 and the closure unit 62 to its open position.

The provision of the grooves 84 permit limited flow of medium into the chamber 42 above the piston 74 (the closure unit receiving cavity 85) when the piston 74 and closure unit 62 are being displaced towards the closed position and limited flow of medium out of the closure unit receiving cavity 85 when the piston 74 and closure unit 62 are being displaced towards the open position. This avoids any significant pressure differential between the closure unit receiving cavity 85 and the second port 52. Without this pressure balancing, a zone of reduced pressure could be created above the piston 74 which could resist displacement of the closure unit 62 towards its closed position. Similarly, a zone of increased pressure could be created above the piston 74 which could resist displacement of the closure unit 62 towards its open position. The dimensions of the grooves are selected to inhibit the passage of large solid particles therethrough. In this embodiment, each groove 84 has a width of 12.5 mm and a maximum depth of about 1.5 mm. The number and depth of grooves required may increase for larger diameters of barrier piston. In another embodiment of the invention, if desired, grooves could instead or in addition be provided in the radially inner surface 59 of the liner 55, and may have any convenient cross-sectional shape or configuration.

The barrier piston 74, head 72, seal 68, stud bolt 76, and nut 78, together may form a valve closure unit which could be replaced as a unit should the seal 68 or one of the other parts become worn or fail. Similarly, the liner 55 and the seat ring 54 could be replaceable wear items. The wear parts such as the valve seat ring 54, valve head 72, barrier piston 74, liner 55, valve seal 68 are easy to replace by removing a top-cover (not shown) and unscrewing the retaining nut 78.

The valve 18.1 will be particularly suitable for use in an environment where the medium contains solid particles such as in the pressure exchange chamber pumping system and will provide reliable operation thereof.

Figures 4, 5:
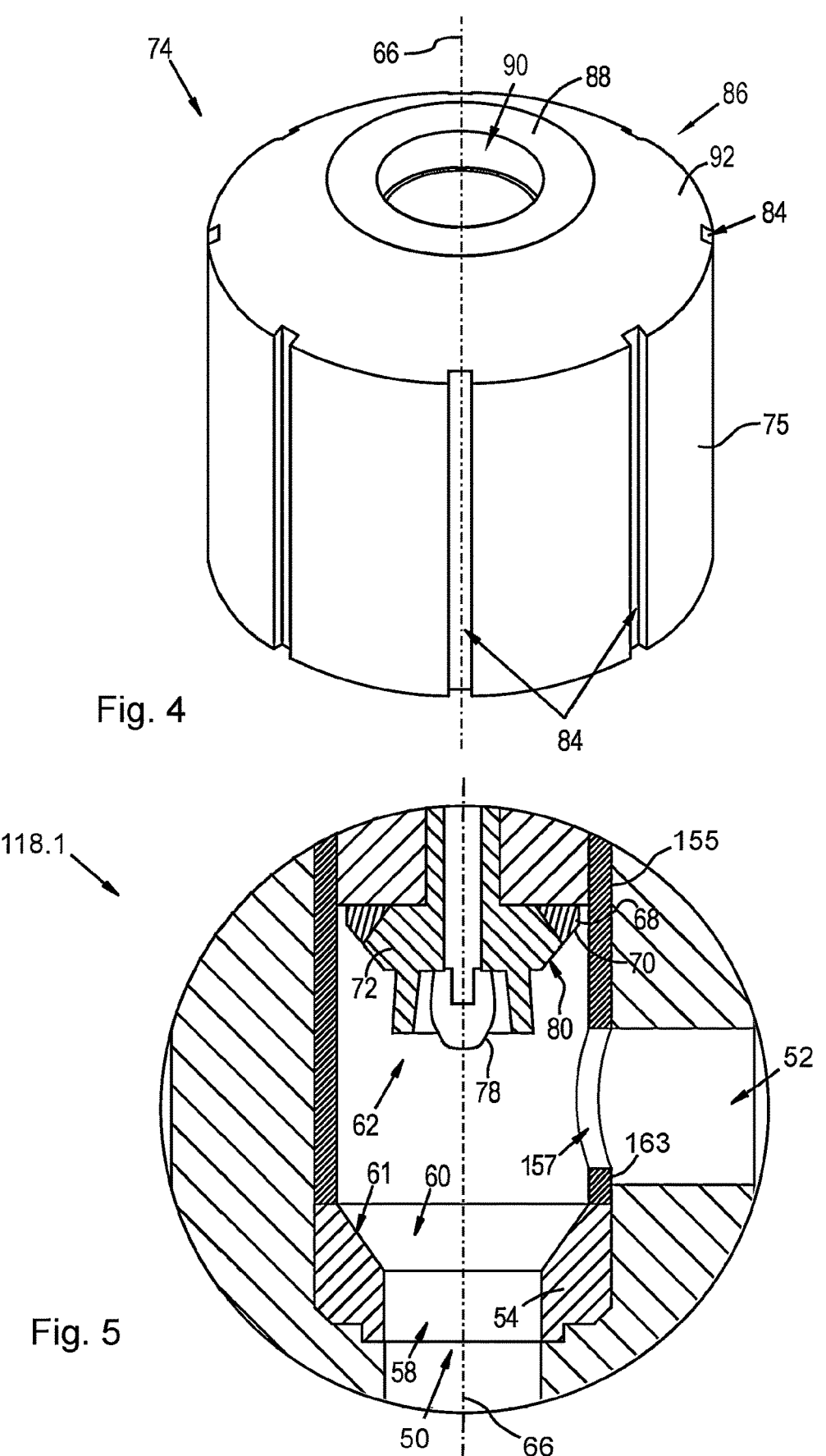
FIG. 4 shows a three-dimensional view of a barrier piston forming part of the valve of FIGS. 2 and 3.
FIG. 5 is a partial sectional view of a valve according to another embodiment of the present invention.

Reference is now made to FIG. 5, which is a partial sectional view of a valve 118.1 according to another embodiment of the present invention. Valve 118.1 is almost identical to valve 18.1, however valve 118.1 has a sleeve (or liner) 155 (instead of sleeve 55) defining an opening 157 that has a smaller diameter than the diameter of the second port 52. The opening 157 is vertically offset from the opening 52 such that a portion of the sleeve 157 acts as a protruding wall 163 extending upwards from a lower portion (floor) of the second port 52. This protruding wall 163 prevents flow of solid particles at the bottom of the second port 52 (where large particles may settle due to gravity) towards the first port 50. When the second port 52 is the outlet, this prevents backflow towards the first port (the inlet) 50.

Although the valve has been described with particular reference to its application as a medium inlet valve in a pressure exchange chamber pumping system, it will be appreciated that it would be suitable for use in many other applications. In particular, it could be used as a medium outlet valve, a driving fluid inlet valve and/or a driving fluid outlet valve. Indeed, a valve in accordance with the invention could be used in applications other than PEC's.

It will be appreciated that a pressure exchange chamber pumping system could be constructed in the first instance accordance with the invention. The components of the pressure exchange chamber pumping system could be transported in knocked-down or kit form for assembly on site. Alternatively, a pressure exchange chamber pumping system in accordance with the prior art could be modified by replacing one or more of the valves with valves in accordance with the invention.

LIST OF REFERENCE NUMERALS

Pressure exchange chamber (PEC) pumping system 10
PEC 11.1, 11.2, 11.3
Pipe 12, 14, 16
Medium valve arrangement 18, 20, 22
Medium inlet valve 18.1, 20.1, 22.1; 118.1
Medium outlet valve 18.2, 20.2, 22.2
Driving fluid valve arrangements 19, 21, 23
Driving fluid inlet valve 19.1, 21.1, 23.1
Driving fluid outlet valve 19.2, 21.2, 23.2
Discharge riser (pipe) 24
Feed arrangement 26
Pipe 32
Feed line 35, 36, 37
Hollow housing 40
Circular cylindrical chamber 42
Cap 43
Bottom (of chamber) 44
Top (of chamber) 46
Side (of chamber) 48
Ports 50, 52
Seat ring 54
Liner (sleeve) 55, 155
Passage 56
Opening 57, 157

Circular cylindrical portion 58
Inner surface (of the liner) 59
Frustoconical portion 60
Valve seat 61
Closure unit 62
Actuator 64
Longitudinal axis 66
Seal 68
Seal surface 70
Head 72
Piston 74
Outer surface 75
Stud bolt 76
Retaining nut 78
Frustoconical surface 80
Actuator rod 82
Grooves 84
Closure unit receiving cavity 85
Upper portion 86
Central portion 88
Bore (of central portion) 90
Outer portion 92
Arrow 96
Protruding wall (of sleeve) 163

The invention claimed is:

1. A valve comprising:
a housing defining a cylinder having a central axis;
a first port;
a second port which is spaced from the first port;
a sleeve concentrically mounted within the housing cylinder and defining a bore transverse to the central axis of the sleeve and in registration with the second port;
a flow path connecting the first port and the second port in flow communication to allow medium containing solid particles to pass therethrough;
a valve seat positioned in the flow path;
a closure unit which is displaceable between a closed position in which it seats against the valve seat to inhibit the flow of medium through the flow path and an open position in which it permits the flow of medium through the flow path;
a cavity configured to receive at least part of the closure unit;
wherein the closure unit further comprises (i) a barrier piston configured to inhibit the flow of solid particles from the second port when the closure unit is in its closed position and thereby inhibit the passage of such solid particles into the cavity; (ii) one or more bleed passages connecting the cavity with the second port in flow communication to provide a pressure balancing arrangement that reduces a pressure differential therebetween, and (iii) a downwards sloping top extending from a central portion of the barrier piston to an outer surface of the barrier piston to permit fine particles in the cavity to settle through the one or more bleed passages towards the second port;
wherein the sleeve surrounds the barrier piston with little clearance between the outer surface of the barrier piston and a radially inner surface of the sleeve at all positions in the cavity other than the bore, so that the sleeve and housing provide support to the barrier piston to reduce or prevent lateral movement that may arise when ore particles are trapped between part of the closure unit and the valve seat.

2. The valve as claimed in claim 1, which defines a circular cylindrical chamber having a first end, a second end and a side extending therebetween, the first port opening into the chamber through the first end and the second port leading from the chamber through the side at a position spaced from the first end.

3. The valve as claimed in claim 2, in which the first end is an operatively bottom end of the chamber, the valve seat is frusto-conical in shape, tapering inwardly downwardly and the closure unit is axially displaceable in the chamber between its open and closed positions.

4. The valve as claimed in claim 3, in which an annular gap between the outer surface of the barrier piston and a radially inner surface of the sleeve is less than 2 mm.

5. The valve as claimed in claim 4, in which the piston extends axially beyond the second port when the closure unit is in its closed position to inhibit the flow of medium from the second port into the chamber above the piston.

6. The valve as claimed in claim 5, wherein the one or more bleed passages are defined by one or more axially extending grooves provided in a radially outer surface of the piston.

7. The valve as claimed in claim 6, wherein the piston comprises a conical upper surface to direct any trapped particles in the cavity towards the axially extending grooves in the piston so that they are guided back to the flow path.

8. The valve as claimed in claim 1, wherein the cylindrical chamber has a larger diameter than the diameter of the second port.

9. The valve as claimed in claim 1, wherein the sleeve bore is offset from a centre of the second port, and defines a wall protruding into the second port.

10. A pressure exchange chamber pumping system which includes:
at least one pressure exchange chamber; and
a medium valve arrangement in flow communication with the pressure exchange chamber and a driving fluid valve arrangement in flow communication with the pressure exchange chamber at a position longitudinally spaced from the medium valve arrangement, the medium valve arrangement and/or the driving fluid valve arrangement including at least one valve according to claim 1.

* * * * *